Feb. 24, 1931.  J. L. DRAKE  1,793,784

SHEET GLASS DRAWING APPARATUS

Filed Oct. 8, 1926

Inventor

John L. Drake.

By Frank Fraser

Attorney

Patented Feb. 24, 1931

1,793,784

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

SHEET-GLASS-DRAWING APPARATUS

Application filed October 8, 1926. Serial No. 140,287.

The present invention relates to sheet glass drawing apparatus.

An important object of the invention is to provide in sheet glass apparatus means whereby a sheet may be continuously drawn from a mass of molten glass, the apparatus including means for protecting the sheet, during its formative period, from the atmosphere.

Another object of the invention is to provide in sheet glass drawing apparatus a receptacle containing a mass of molten glass, means for drawing a sheet from said molten glass, and a hood arranged over the molten glass adapted to protect the surface of the molten glass and the sheet, during its formative period, from the atmosphere.

Still another object of the invention is to provide an apparatus of this nature including a receptacle containing a mass of molten glass, and means for continuously drawing a sheet from said mass, the invention relating particularly to preferably metallic plates arranged over the molten glass and having a slot therein through which the sheet passes, the edges of the slot being arranged in spaced relation to the sheet so that there is no contact between the two.

Still another object of the invention is to provide an apparatus of this nature including a receptacle for containing a mass of molten glass from which a sheet may be continuously drawn, lip tiles arranged above the molten glass and one on either side of the sheet, and adjustable plates associated with the lip tiles and being adapted to form a compartment in which the sheet is formed.

A still further object of the invention is to provide in sheet glass apparatus, a receptacle containing a mass of molten glass, means for drawing a sheet therefrom, and means for creating a closed compartment around the sheet during its formative period to protect the same from the atmosphere, said compartment being such that the desired temperature conditions can be set up and maintained therein.

Other objects and advantages of the invention will become more apparent during the course of the following description when taken in connection with the accompanying drawings.

Figure 1:
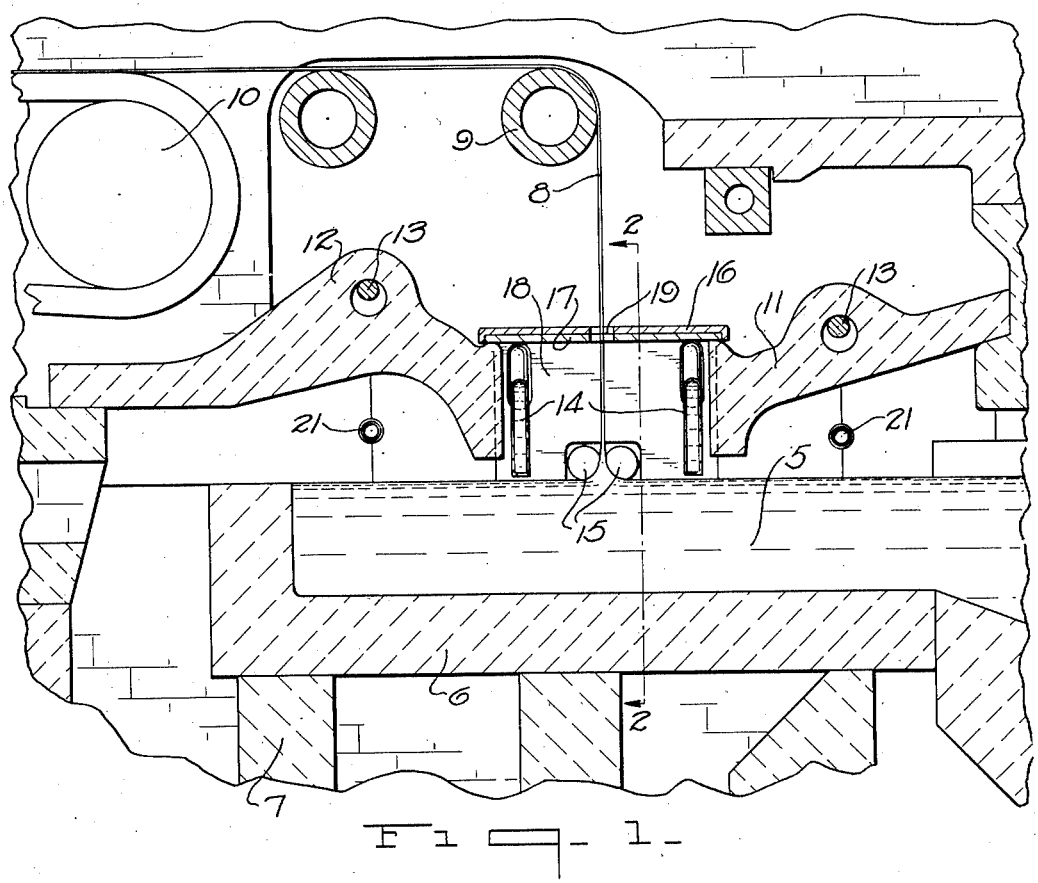
Figure 2:
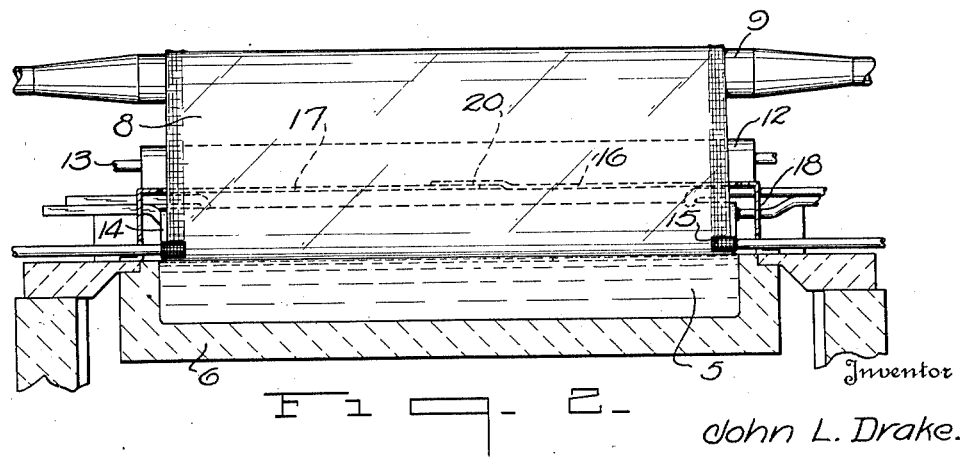

In the drawings wherein like numerals are employed to designate like parts throughout the same, Fig. 1 is a fragmentary vertical longitudinal section through a sheet drawing apparatus disclosing my invention in use, and Fig. 2 is a section taken on line 2—2 in Fig. 1.

The present invention relates particularly to the type of machine disclosed in the Colburn Patent No. 1,248,809, granted December 4, 1917, although it is not necessarily limited to such machine.

In producing a sheet of glass in accordance with the Colburn patent, a mass of molten glass 5 is continuously supplied to a draw pot or other form of receptacle 6 which is supported upon suitable stools 7. A sheet 8 is continuously drawn from the molten mass 5, being deflected from a vertical plane to a horizontal plane by means of a roll 9. The numeral 10 designates a drawing and flattening table. Arranged above the molten mass 5 are lip tiles 11 and 12 respectively, one lip tile being arranged on one side of the sheet and the other lip tile being arranged on the opposite side. The lip tiles are supported in position by means of the hangers 13. Each lip tile has a water-cooled shield 14 associated therewith through which is adapted to be circulated a suitable cooling medium. The lower surfaces of the shields 14 are arranged relatively close to the surface of the molten mass 5, and in combination with the lip tiles 11 and 12 are adapted to protect the sheet 8 from the heat and gases present around the furnace. Suitable edge engaging means 15 are provided to prevent narrowing of the sheet.

It has been customary in the commercial operation of the Colburn machine to expose the surface of the molten glass 5, lying between the shields 14, to the atmosphere. The base of the sheet and sheet proper are also exposed to the atmosphere. It has been found that the slightest changes in the atmosphere have considerable effect upon the quality of sheet produced, and in fact the mere opening or closing of a door or window in the building in which the machine is located has its effect upon the sheet.

It is an aim of the present invention to provide means for creating a compartment to protect the sheet, during its formative period, as well as the surface of the molten glass from which the sheet is produced, from the atmosphere, so that desired temperatures can be set up and maintained at the points mentioned regardless of the changes in the atmosphere.

In following out the invention a pair of plates 16 and 17, having the depending ends 18, are arranged over the molten mass and may be supported upon the lip tiles or the cooler supports. Each plate has a slot 19 therein, the width of which is such that the sheet 8 can be passed through the slot without contact with the plates. The end of one of the plates is offset as at 20 to permit the two to cooperate in a manner to form a continuous cover over the molten glass. The ends are also such that the plates can be adjusted to accommodate various sizes of pots. The plates are preferably formed from a non-corrosive metallic alloy such as nichrome, stellite, Monel metal, or the like. It is preferable that the metal used is non-scaling so that no dirt or other foreign matter will result from their use.

Burners 21 may be arranged beneath the lip tiles so that the desired temperature of the glass can be had.

In operation, the plates are arranged over the molten glass as illustrated so that the surface of the glass between the shields 14 will be protected from the atmosphere. The height of the plates as illustrated is such that the sheet will be protected during its formative period, the contact with the atmosphere above the plates being negligible as the effect of atmospheric changes on the sheet after it has become substantially set is little.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a receptacle containing a mass of molten glass, means for drawing a sheet therefrom, heat absorbing shields arranged above the molten glass, and means for forming a closed compartment between said shields, said sheet being formed in the closed compartment.

2. In sheet glass apparatus, a receptacle containing a mass of molten glass, means for drawing a sheet therefrom, a shield arranged above and spaced from the mass of molten glass at each side of the sheet, and means for forming a closed compartment between the shields and around the base of the sheet.

3. In sheet glass apparatus, a receptacle containing a mass of molten glass, means for drawing a sheet therefrom, a shield arranged above and spaced from the mass of molten glass at each side of the sheet, and slotted plate means supported on said shields, the sheet of glass passing through said slot.

4. In sheet glass apparatus, a receptacle containing a mass of molten glass, means for drawing a sheet therefrom, a shield arranged above and spaced from the mass of molten glass at each side of the sheet, and slotted plate means supported on said shields, the sheet of glass passing through said slot and out of contact with the edges thereof.

5. In sheet glass apparatus, a receptacle containing a mass of molten glass, means for drawing a sheet therefrom, a lip tile arranged above and spaced from the mass of molten glass at each side of the sheet, a heat absorbing shield associated with each tile, and means for forming a closed compartment between said shields for protecting the sheet, during its formative period, from the atmosphere.

6. In sheet glass apparatus, a receptacle containing a mass of molten glass, means for drawing a sheet therefrom, a lip tile arranged above the mass of molten glass and spaced therefrom at each side of the sheet, a heat absorbing shield also arranged at each side of the sheet inwardly of the lip tiles, a plurality of slidably associated slotted plates extending between and supported by said lip tiles, the said sheet passing through the slots in said plates and out of contact therewith, said plates extending beyond the edges of the sheet and being turned downwardly to form the ends of a substantially closed compartment formed by the said plates and lip tiles and which compartment substantially encloses the sheet during the formative period thereof.

7. In sheet glass apparatus, a receptacle containing a mass of molten glass, means for drawing a sheet therefrom, heat absorbing shields, and means for forming a closed compartment between said shields, said sheet being formed in the closed compartment, and then passing through the top thereof.

Signed at Toledo, in the county of Lucas and State of Ohio, this 5th day of October, 1926.

JOHN L. DRAKE.